R. H. RAMSEY.
Car-Truck Shifting Apparatus.
No. 8,259. Reissued May 28, 1878.
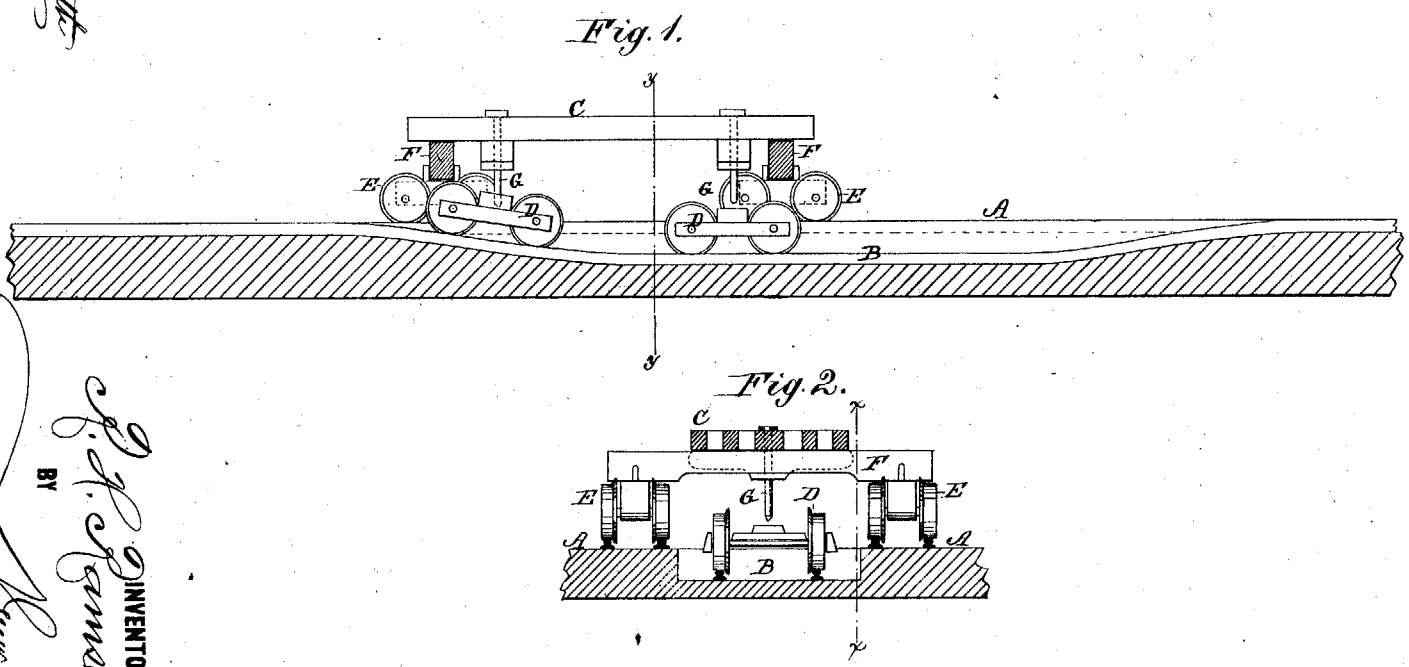
WITNESSES:
W. W. Hollingsworth
Edw. W. Byrn
INVENTOR:
R. H. Ramsey
BY
Dana & Co
ATTORNEYS.
N. PETERS, PHOTO-LITHOGRAPHER, WASHINGTON, D. C.

UNITED STATES PATENT OFFICE.

ROBERT H. RAMSEY, OF PHILADELPHIA, PENNSYLVANIA.

IMPROVEMENT IN CAR-TRUCK SHIFTING APPARATUS.

Specification forming part of Letters Patent No. 178,079, dated May 30, 1876; Reissue No. 8,259, dated May 28, 1878; application filed March 28, 1878.

*To all whom it may concern:*

Be it known that I, ROBERT H. RAMSEY, of the city and county of Philadelphia and State of Pennsylvania, have invented a new and Improved Car-Truck Shifting Apparatus; and I do hereby declare that the following is a full, clear, and exact description of the same, reference being had to the accompanying drawing, forming part of this specification, in which—

Figure 1 is a longitudinal section of the depressed railway and beams and side elevation of the trucks, showing my improved shifting contrivance, the section being taken on the line *x x* of Fig. 2; and Fig. 2 is a transverse section taken on the line *y y* of Fig. 1.

My invention relates to an improved car-truck shifting apparatus, whereby car-loads of freight or passengers may be transferred from a broad to a narrow gage road, or vice versa, without breaking bulk, the general plan employed being that of removing the car-trucks and substituting others of a different gage adapted to the broader or narrower gage of the road which is to form a continuation of the journey, or for removing trucks at shops, yards, or depots when it is necessary to repair cars.

My invention takes advantage of the separable character of the king-bolt connection of the car-body to the truck and the adaptability of the different car-trucks to the same car-body.

The invention consists in combining independent side rails and independent shifting-trucks with the rails of the different gages of road, arranged centrally the one within the other and in the same plane, the said side rails being arranged, with respect to the central main rails, in a different plane or grade, with an incline at each end running into the same plane, so that as the cars traverse the tracks the side trucks receive and sustain the body of the car, while the main trucks, by reason of the difference in grade, drop from their places, and allow trucks of a different gage to be substituted instead, or trucks removed for repairing purposes.

In the drawing, B represents the main track, and A A the independent side tracks, which side tracks, as shown, are upon a level with the main portion of the main track, while the main track at the point where the shifting is effected is depressed below the level of its line-grade and that of the side tracks, and has an incline at each end leading again into the plane of the said side tracks and main body portion. In the same plane of the main track are arranged the two sets of rails of different gage, the narrow gage being arranged centrally between the broad gage; and upon the side tracks, upon each side of the main rails, are arranged two rails for the shifting-trucks. C is the car-body, connected with the trucks D by the king-bolt G; E E, the two independent shifting-trucks, arranged upon the side rails; and F F, cross-beams extending from side truck to side truck beneath the car-body, and adapted to sustain the weight of the latter when the differential grade has effected the separation of its own trucks.

In operating the apparatus, as thus described, the car, as supported by its trucks, and the side or shifting trucks are arranged side by side upon that portion of the track in which all the rails are in the same plane. The cross-beams F are adjusted then at each end of the car transversely to the tracks, so as to rest upon the side trucks and pass beneath the car-body in position to sustain the same. The car and trucks are then pushed together across the differentially-graded portion, and as the trucks D of the car pass down the incline into the depressed portion of the main track they separate from the king-bolts of the car-body, which is sustained upon the cross-beams F resting upon the side trucks. The trucks thus disconnected are left at the entering end of the depression, and, as the car passes over, its king-bolt is made to register with the trucks of a different gage, which are placed at the opposite or leaving end of the depression, which latter trucks, when pushed up the incline of the main track, receive the king-bolts of the car-body; and, finally, when the car-body has proceeded a sufficient distance upon the side trucks, from the draft of a locomotive or other power, they become firmly seated and receive the burden of the car-body, hitherto sustained by the side truck.

As shown, it will be seen that the main track is depressed to secure the incline, while the side tracks are level. I do not confine myself to this arrangement, however, as any arrangement of differential grade, as between the side and main tracks, would secure the same result—as, for instance, the main tracks might be level and the side tracks elevated. I prefer, however, the arrangement shown, as it is easier to move the car along the level road and the trucks up the inclines than to move the loaded car up the incline.

In defining more clearly the scope of my invention, I would state that I am aware that it is not new to shift the trucks of a car for a broader or narrower gage of road by means of wheels arranged upon the forward and rear ends of a car-body, adapted to run upon an elevated inclined single rail upon each side, so as to lift bodily the car and its contents from its trucks and allow the latter to be shifted. The objections to this arrangement are, first, every car-body must be provided with at least four unsightly wheels, which have to be carried everywhere the car travels, and these are not only expensive and unsightly, but do not form a sufficient support for a loaded car; secondly, these wheels, to be made strong enough, have to be close up or flat against the body of the car, and in cars of different widths these wheels would not register with the inclined elevated rails; and, thirdly, the whole bulk of car-body and contents has to be lifted, which involves not only a greater traction but an unnecessary strain upon the framing carrying the single elevated side rails.

By combining with the differentially-graded tracks a set of independent side trucks, supported each upon two rails, all of the beforementioned objections are obviated.

I am aware, also, that a still closer analogy to my devices exists in the patent to Tisdale, granted June 10, 1873, in which side tracks having two rails each are employed in connection with main tracks of different gage, a single incline, and a carriage extending from side track to side track formed of two permanently-connected side trucks. The connection of the side trucks here by a permanent cross-bar requires that the carriage thus formed shall be low, in order to allow the step of the car to pass over, and the making of the carriage low necessitates small wheels, which are moved only with difficulty.

The independent character of my side trucks permits them to be made as large as ordinary trucks of the car, so that the shifting can be readily effected by hand.

The transverse permanent connection of the side trucks in Tisdale's device also permits the shifting of only one car at a time, which car has to be backed up, shifted, and then placed upon a siding.

My independent and disconnected side trucks, combined with the tracks, graded as described, with two inclines, one at each end, permit several or all the cars of a train to be shifted without even uncoupling the cars, each car leaving successively one set of trucks in the depression and taking up another, and thus shifting the train in a nearly automatic manner by simply passing over the apparatus.

Among other distinctive advantages may be mentioned the fact that my devices permit the shifting of cars at either end, and that the separate and removable character of the side trucks permits them to be taken away, and the side rails employed for the ordinary purposes of a siding, none of which advantages belong to the devices disclaimed.

Having thus described my invention, what I claim as new is—

1. Independent side trucks and tracks combined with a main track having two or more gages of track arranged upon a different grade from the side tracks, and having an incline at each end of the graded portion, for the purpose of shifting the trucks of a car, substantially as described.

2. Independent side trucks and tracks combined with a main track having two or more gages of track upon a different grade from the side tracks, with an incline at each end of the grade, and with removable cross-beams adapted to extend transversely from side truck to side truck and support the car-body, substantially as and for the purpose described.

3. Independent side trucks adapted to sustain the weight of a car-body, substantially as described, and combined with an intermediate main track and independent side tracks graded at each end with an incline from a plane in which the tracks are all upon a level to point where the side tracks and main track are upon different levels, substantially as and for the purpose described.

4. The combination, with a car, of a beam placed under each end thereof, and supported by independent side trucks that roll on tracks outside of and on a higher plane than the main track, substantially as and for the purpose described.

ROBERT H. RAMSEY.

Witnesses:

W. G. GRIFFITH,

C. F. WARWICK.